(12) United States Patent
Long, II et al.

(10) Patent No.: US 7,070,363 B2
(45) Date of Patent: Jul. 4, 2006

(54) CUTTING INSERT FOR HIGH-SPEED MILLING CUTTER

(75) Inventors: Thomas J. Long, II, Greensburg, PA (US); Shawn E. Frye, Latrobe, PA (US); Karen A. Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 188 days.

(21) Appl. No.: 10/891,677

(22) Filed: Jul. 15, 2004

(65) Prior Publication Data

US 2006/0013661 A1    Jan. 19, 2006

(51) Int. Cl.
*B23C 5/20* (2006.01)

(52) U.S. Cl. .................. 407/113; 407/114; 407/115; 407/116

(58) Field of Classification Search ............... 407/113, 407/114, 115, 116, 117, 30
See application file for complete search history.

(56) References Cited

U.S. PATENT DOCUMENTS

| | | | |
|---|---|---|---|
| 2,289,344 A | | 7/1942 | Cedarleaf |
| 4,315,706 A | | 2/1982 | Erkfritz |
| 4,852,622 A | | 8/1989 | Eriksson |
| 4,919,573 A | | 4/1990 | Tsujimura et al. |
| 4,940,369 A | | 7/1990 | Aebi et al. |
| 5,052,863 A | * | 10/1991 | Satran ........................ 407/113 |
| 5,071,292 A | * | 12/1991 | Satran ........................ 407/116 |
| 5,167,473 A | | 12/1992 | Barnett |
| 5,221,162 A | | 6/1993 | Okawa |
| 5,466,097 A | * | 11/1995 | Wallstrom .................. 407/113 |
| 5,486,073 A | | 1/1996 | Satran et al. |
| 5,513,931 A | * | 5/1996 | Reiterman et al. .......... 407/113 |

(Continued)

FOREIGN PATENT DOCUMENTS

EP        0237376 B1      9/1987

(Continued)

OTHER PUBLICATIONS

Mitsubishi Carbide Brochure LJ408A, "Shoulder type indexable end mill for aluminum alloy, BXD type," Mitsubishi Materials U.S.A. Corporation, Irvine, California, Mar. 2003, 6 pages.

*Primary Examiner*—Willmon Fridie, Jr.
(74) *Attorney, Agent, or Firm*—Larry R. Meenan (57) ABSTRACT

An indexable cutting insert (10) having a top surface (12) including a substantially planar central portion (48), a substantially planar bottom surface (14), and a plurality of side surfaces (16, 18, 20, 22). A long cutting edge (24, 26), a corner radius cutting edge (28, 30), a facet radius cutting edge (32, 34), and ramping cutting edge (36, 38) are defined at an intersection between the top surface (12) and one of the side surfaces (16, 18, 20, 22). A margin (87, 89) extends around a nose radius of the cutting insert (10) and blends into a flat surface (94, 96). A margin angle, C, formed by the margins (87, 89) is less than a seating angle, B, formed by the flat surfaces (94, 96). The top surface (12) includes a plurality of upward sloping radius blends (50, 52, 54, 56, 58, 60, 62, 64) extending between the substantially planar central portion (48) and a plurality of upward sloping rake faces (70, 72, 74, 76, 78, 80, 82, 84, 86, 88, 90, 92) extending between a respective radius blend and its respective cutting edge such that the rake face forms an angle, A, of between five and twenty-five degrees with respect to the central portion (48) of the top surface (12).

23 Claims, 5 Drawing Sheets

U.S. PATENT DOCUMENTS

| | | |
|---|---|---|
| 5,593,255 A | 1/1997 | Satran et al. |
| 5,653,274 A | 8/1997 | Johnson et al. |
| 5,810,519 A * | 9/1998 | Vogel et al. ............... 407/114 |
| 5,836,724 A | 11/1998 | Satran et al. |
| 5,853,267 A | 12/1998 | Satran et al. |
| 5,893,683 A | 4/1999 | Johnson |
| 6,048,140 A | 4/2000 | Johnson |
| 6,102,630 A | 8/2000 | Flolo |
| 6,203,251 B1 | 3/2001 | Oppelt et al. |
| 6,530,726 B1 | 3/2003 | Nelson |
| 2002/0037199 A1 | 3/2002 | Satran et al. |
| 2002/0146293 A1 | 10/2002 | Nelson |
| 2003/0170079 A1 | 9/2003 | Daiguji et al. |
| 2004/0071515 A1 | 4/2004 | Arvidsson et al. |

FOREIGN PATENT DOCUMENTS

| | | |
|---|---|---|
| EP | 0 582 981 A1 | 2/1994 |
| GB | 2078313 A | 1/1982 |
| WO | WO 93/19214 A1 | 9/1993 |
| WO | WO 01/25505 A1 | 4/2001 |

* cited by examiner

CUTTING INSERT FOR HIGH-SPEED MILLING CUTTER

CROSS-NOTING TO RELATED APPLICATION

This application is related to U.S. patent application Ser. No. 10/754,825, filed Jan. 9, 2004, entitled "High-Speed Milling Cutter and Insert", the entire contents of which are incorporated herein by reference.

BACKGROUND OF THE INVENTION

1. Field of the Invention

This invention relates to a cutting insert for a high-speed milling cutter. More particularly, this invention relates to an indexable cutting insert for a long edge, high-speed milling cutter for milling a metallic work piece, such as aluminum, or the like.

2. Description of the Related Art

Milling cutters for performing machining operations on metallic work pieces are well known in the prior art. Such cutters typically comprise a cylindrical or disc-shaped body which is detachably connectable to a rotating drive shaft. A plurality of cutting inserts are mounted around the outer periphery of the cutter body for producing a series of metal-shaving cuts on a work piece. In operation, such milling cutters are typically rotated at speeds of several thousand rpm while a metal work piece is engaged with the inserts in the cutter body.

Recently, there has been an increased demand for milling cutters capable of operating at rotational speeds far in excess of several thousand rpm. The advantages associated with such high-speed milling include a faster cutting action which results in a higher metal removal rate on the work piece, a reduction in the cutting forces applied to the cutting inserts by the work piece, and a smoother final cut. Such reduced cutting forces protract the operating life of the inserts, not only reducing the costs associated with insert replacement, but also the amount of downtime necessary to reorient the cutting edges of indexable inserts. The cost and time of fixturing is also reduced because higher cutting forces require more elaborate and more rigid fixturing to achieve desired accuracy.

As a result of these advantages, a high-speed milling cutter not only lowers machining costs while increasing productivity, but also enhances the quality of the final machined work piece since the cutting action is smoother, and leaves a better finish. It will be appreciated that the substantial increase in rotational speed necessary to obtain all the aforementioned advantages also results in a substantial increase in the centrifugal forces generated in the body of the cutter. Generally speaking, the centrifugal force $F_c$ is dependent upon the mass (m) of the cutter body supporting the cutting insert, the length of the radius (r) of the cutter body, and the square of the angular velocity ($\Omega$) of the body. The relationship between these parameters may be expressed in the equation $F_c=(m\Omega^2)(r)$. The fact that the centrifugal force (and hence tensile stress) on the cutter body increases with the square of the angular velocity has, up to now, posed a substantial obstacle in the development of a milling cutter capable of operating at speeds higher than several thousand rpm. A milling cutter rotating at 10,000 rpm would have 25 times more centrifugally induced tensile stress along its periphery than when it was operated at 2,000 rpm. If the same cutter is spun at 20,000 rpm, it would have over 100 times more centrifugally induced tensile stress.

In addition, the substantial increase in rotational speed necessary to obtain all the aforementioned advantages also results in a substantial increase in the centrifugal forces generated on the inserts of the cutter. Specifically, the centrifugal forces tend to cause the inserts to become unseated from the insert pocket during high-speed milling operations. Thus, there is a need for a high-speed milling cutter capable of operating at high speeds, for example, about 20,000 rpm that securely and positively retains the cutting inserts within the insert pockets of the cutter body. Ideally, such a high-speed milling cutter and cutting inserts should be relatively inexpensive to manufacture, and should utilize inexpensive, readily replaceable cutting inserts so as to minimize both the cost of fabrication and operation of the device.

Finally, the art of machining materials such as aluminum teaches that the trend is for incorporation of vacuum systems to rid the work area of cut material (chips) in the immediate vicinity of the tool. These systems are quick to clog if the shape and/or size of the chips are not controlled to manageable levels. Thus, the successful tool will be one whose insert topography generates the controlled chip.

SUMMARY OF THE INVENTION

The inventors of the present invention have recognized these and other problems associated with high-speed milling cutters and associated cutting inserts. Briefly, according to this invention, there is provided an indexable cutting insert for a high-speed, long edge milling cutter. As used herein the term "long edge milling cutter" refers to a milling cutter utilizing an insert having a cutting edge greater than about ⅝ of an inch. The cutting insert includes a top surface having a substantially planar central portion, a substantially planar bottom surface, and a plurality of side surfaces; one side surface including a flat surface extending from the bottom surface and a margin extending from the top surface to the flat surface; a long cutting edge defined at an intersection between the top surface and the margin of one of the side surfaces; a corner radius cutting edge defined at an intersection between the top surface and one of the side surfaces; a facet radius cutting edge defined at an intersection between the top surface and one of the side surfaces; and a ramping cutting edge defined at the intersection between the top surface and one of the side surfaces. The margin extends around a nose radius of the cutting insert and blends into the flat surface. The margin angle formed by the margin is less than a seating angle formed by the flat surface.

In another aspect of the invention, a high-speed, long edge milling cutter includes a shank having an insert pocket, and at least one indexable cutting insert having a top surface having a substantially planar central portion, a substantially planar bottom surface, and a plurality of side surfaces; one side surface including a flat surface extending from the bottom surface and a margin extending from the top surface to the flat surface; a long cutting edge defined at an intersection between the top surface and the margin of one of the side surfaces; a corner radius cutting edge defined at an intersection between the top surface and one of the side surfaces; a facet radius cutting edge defined at an intersection between the top surface and one of the side surfaces; and a ramping cutting edge defined at the intersection between the top surface and one of the side surfaces. The margin extends around a nose radius of the cutting insert and blends into the flat surface. The margin angle formed by the margin is less than a seating angle formed by the flat surface.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Referring to FIGS. 1–6, wherein like reference characters represent like elements, an indexable cutting insert 10 includes generally, a top surface 12, a bottom surface 14 and side surfaces 16, 18, 20, 22.

The side surface 18 is further comprised of a first side surface 18a, and a second side surface 18b that is angled less than ninety (90) degrees with respect to the first surface 18a. Similarly, side surface 20 is further comprised of sides surfaces 20a, 20b that are also angled with respect to each other. First or long cutting edges 24, 26 are defined at the intersections between the top surface 12 and the side surfaces 16, 20, respectively. Second or corner radius cutting edges 28, 30 are defined generally at the intersections between the top surface 12 and the side surfaces 16, 18, 20 and 22. Specifically, the corner radius cutting edge 28 is defined generally at the intersection of side surfaces 16, 22, and the corner radius cutting edge 30 is defined generally at the intersection of side surfaces 18, 20. Third or facet radius cutting edges 32, 34 and fourth or ramping cutting edges 36, 38 are defined generally at the intersection between the top surface 12 and the side surfaces 18, 22 respectively.

Transitional edges or radius reliefs 40, 42 are located at the corner intersection between the top surface 12 and the facet radius cutting edges 32, 34, and between the top surface and the ramping cutting edges 36, 38, respectively. Similarly, transitional edges or radius reliefs 44, 46 are located at the intersection between the top surface 12 and the ramping cutting edges 36, 38, and between the top surface 12 and the long cutting edges 24, 26, respectively. The transitional edges 40, 42, 44, 46, which is a radius in the illustrations, but would similarly satisfy the concept as any desirable manufacturable shape, such as a chamfer, sharp corner, or the like.

Although other angles are within the contemplated scope of the invention, the facet radius cutting edges 32, 34 of the illustrated embodiment form an angle of approximately ninety (90) degrees with respect to the long cutting edges 24, 26. On the other hand, the ramping cutting edges 36, 38 form an angle of less than ninety (90) degrees, for example, in a range of approximately forty-five (45) degrees to approximately eighty-five (85) degrees with respect to ramping cutting edge 36, 38. A portion of the ramping cutting edge 36, 38 nearest its respective facet radius cutting edge 32, 34 can be used when the cutting insert 10 performs down ramping operations, defined as increased axial depth of cut as the tool progresses along a work piece (not shown). However, the remaining portion of the ramping cutting edge 36, 38 distal its respective facet radius cutting edge 32, 34 is a trailing edge that does not participate in the cutting of the work piece.

The top surface 12 of the cutting insert 10 also includes a substantially planar central portion 48 that is generally parallel to the substantially planar bottom surface 14. The top surface 12 further includes a plurality of rake faces and a plurality of radius blends that provide a transition for the topography of the top surface 12 between the central portion 18 and the various rake faces of the cutting insert 10. For example, the radius blends may be slightly concave in cross section to provide a transition between the substantially planar topography of the central portion 48 and the rake faces that slope upwardly to its respective cutting edge. Specifically, radius blends 50, 52 are located between the central portion 48 and the rake faces 70, 72 that slope upwardly to the long cutting edges 24, 26, respectively. Radius blends 54, 56 are located between the central portion 48 and the rake faces 74, 76 that slope upwardly to the corner radius cutting edges 28, 30, respectively. Radius blends 58, 90 are located between the central portion 48 and the rake faces 78, 80 that slope upwardly to the facet radius cutting edges 32, 34, respectively. Radius blends 62, 64 are located between the central portion 48 and the rake faces 82, 84 that slope upwardly to the ramping cutting edges 36, 38, respectively. Radius blends 66, 68 are located between the central portion 48 and the rake faces 86, 88 that slope upwardly to the transitional edges 44, 46. Note that a very small radius blend is located between the central portion 48 and rake faces that slope upwardly to the transitional edges 40, 42, respectively. The rake faces are used to effectively evacuate chips formed during milling operations with regard to the top surface 12.

Figure 1:
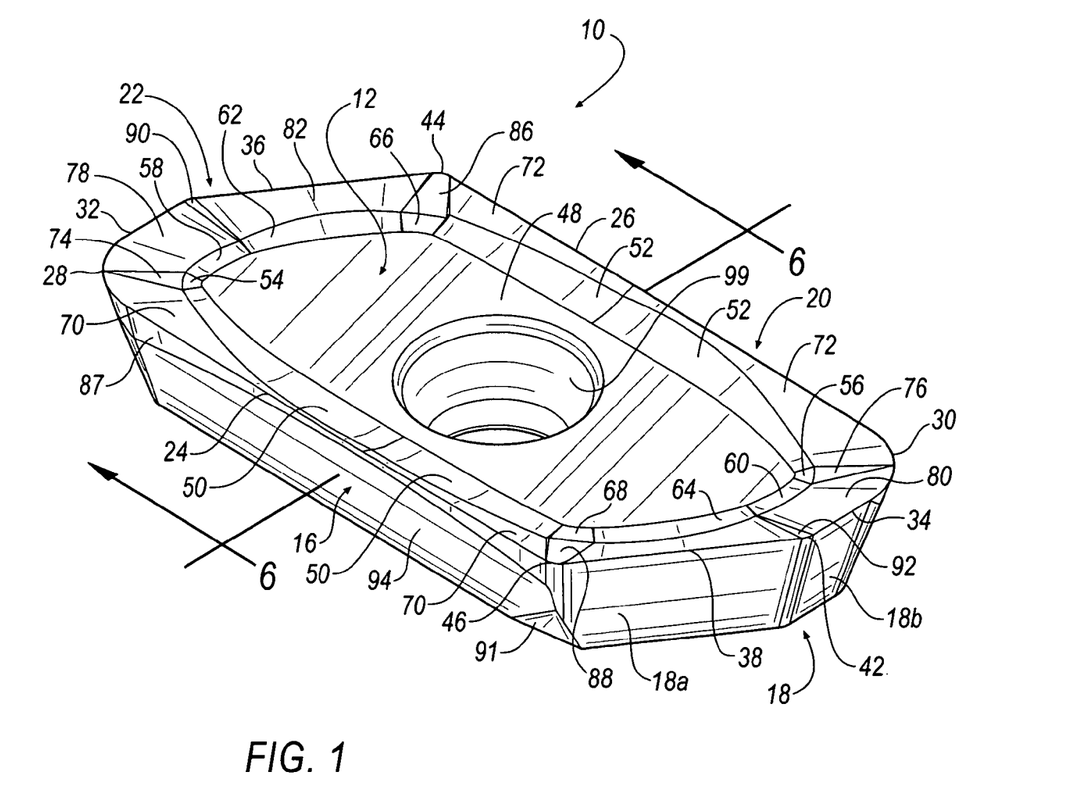
FIG. 1 shows a perspective view of an indexable cutting insert according to an embodiment of the invention.
Figure 2:
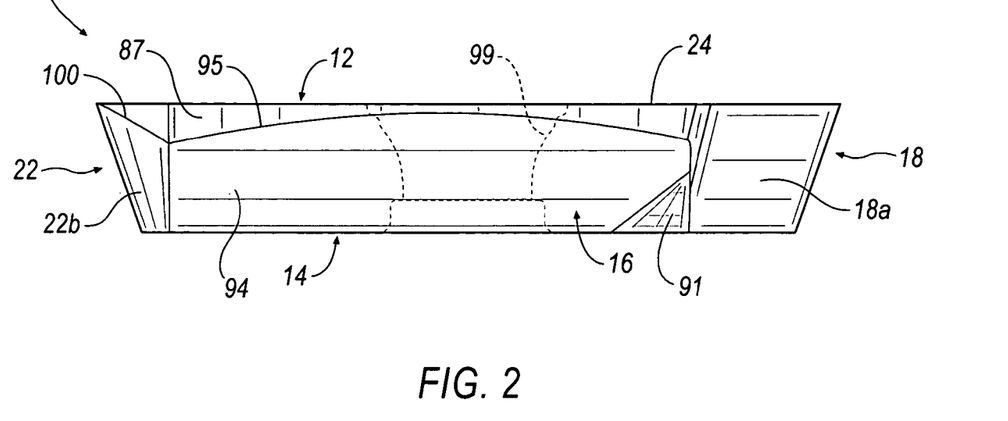
FIG. 2 shows an side elevational view of the cutting insert of FIG. 1.

Referring to FIGS. 1 and 2, to facilitate insertion and removal of the cutting insert 10 in an insert pocket described below, a countersunk bore 99 is provided extending from the top surface 12 to the bottom surface 14 of the cutting insert 10, and preferably located in the central portion 48 of the top surface 12 of the cutting insert 10.

Figure 6:
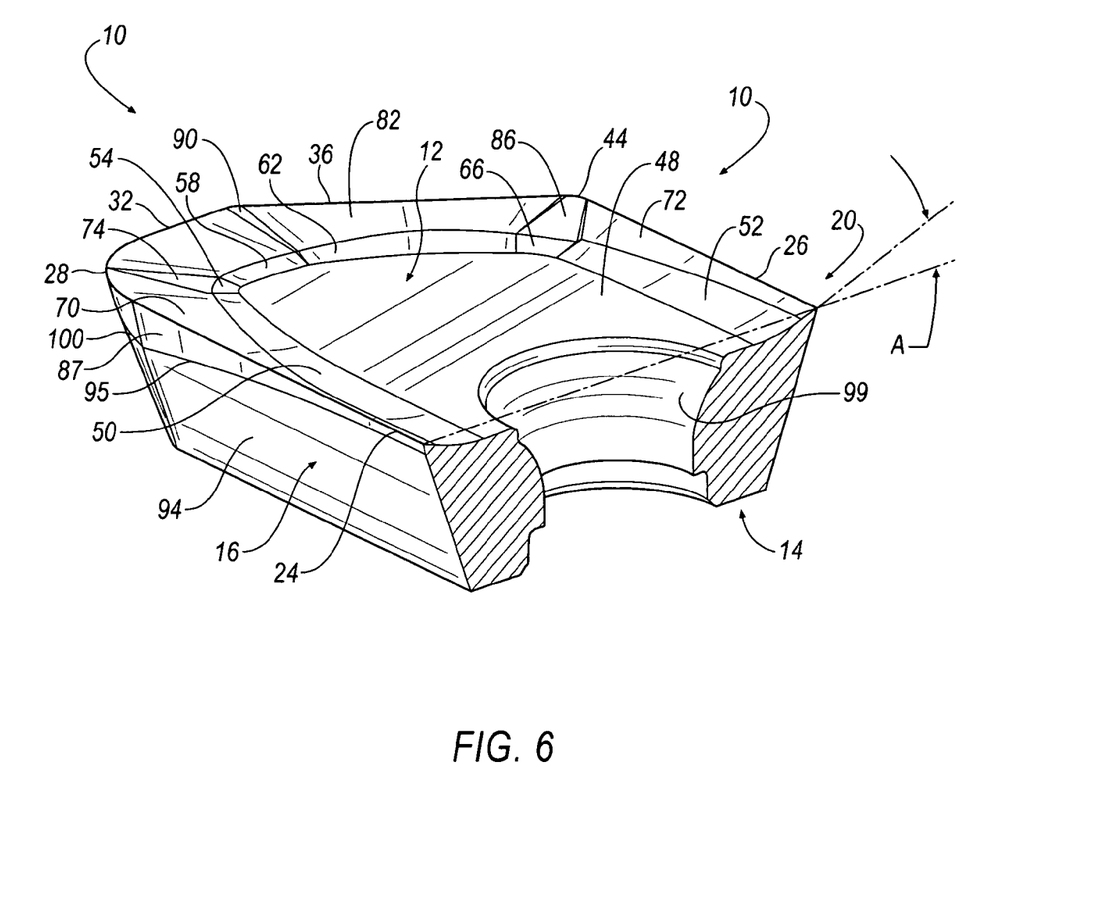
FIG. 6 shows a cross-sectional view of the cutting insert taken along line 6—6 of FIG. 1.

One aspect of the invention is that the topography of the top surface 12 of the cutting insert 10 is designed for high-speed milling operations of a metallic work piece, such as aluminum, and the like. Specifically, the rake faces 70, 72 that extend from the radius blends 50, 52 to the long cutting edges 24, 26 of the cutting insert 10 slope upwardly at an angle in a range of approximately fifteen (15) to twenty-five (25) degrees, for example, at an angle, A, of approximately twenty (20) degrees with respect to the planar central portion 48 of the top surface 12 (and also the bottom surface 14), as shown in FIG. 6. This upward angle is designed to provide improved chip formation and cutting action for the cutting insert 10. In addition, the rake faces 74, 76 that extend from the radius blends 54, 56 to the corner radius cutting edges 28, 30, the rake faces 78, 80, the rake faces 82, 84 and the rake faces 90, 92 slope upwardly at a relatively smaller angle, for example, at an angle in the range of approximately five (5) to fifteen (15) degrees with respect to the central portion 48 of the top surface 12. For example, the rake faces 74, 76 that extend from the radius blends 54, 56 to the corner radius cutting edges 28, 30 may slope upward at an angle of approximately seven (7) degrees.

In another example, the rake faces 82, 84 that extend from the radius blends 58, 60 to the facet radius cutting edges 32, 34 may slope upward at an angle of approximately ten (10) degrees. In yet another example, the rake faces 86, 88 that extend from the radius blends 62, 64 to the ramping cutting edges 36, 38 may slope upward at an angle of approximately eleven (11) degrees. In still yet another example, the rake faces 90, 92 that extend from between the radius blends 58, 60, 62, 64 to the transitional edges or radial reliefs 40, 42, 44, 46 may slope upward at an angle of approximately nine (9) degrees. These upward angles are designed to provide stronger corner radius cutting edges 28, 30, stronger facet radius cutting edges 32, 34, and stronger ramp cutting edges 36, 38, as compared to conventional cutting inserts. It will be appreciated that the invention is not limited by the amount that the rake faces slope upwardly from its respective blend radius to its respective cutting edge, and that the invention can be practiced with any desirable amount of angle to provide improved chip formation and strength. Thus, the topography of the top surface 12 of the cutting insert 10 of the invention is such that the central portion 48 is substantially planar and lowest in elevation that gradually slopes upward in a concave fashion to the cutting edges 24, 26, 28, 30, 32, 34, 36, 38.

Although other variations are possible, it should be noted that the amount of upward slope at each cutting edge is inversely proportional to the distance from the central portion 48 to the respective cutting edge. For example, the distance between the central portion 48 and the cutting edges 24, 26 is the shortest, but the cutting edges 24, 26 have the greatest amount of upward slope, whereas the distance between the central portion 48 and the cutting edges 28, 30 is the greatest, but the cutting edges 28, 30 have the least amount of upward slope. In this manner, all of the cutting edges 24, 26, 28, 30, 32, 34, 36, 38, 40, 42 lie on the same plane, indicated by the dashed line in FIG. 6, which is substantially parallel to a plane along the central portion 48, and parallel to a plane along the bottom surface 14 of the cutting insert 10.

As illustrated in FIGS. 1–6, the cutting insert 10 preferably, but not necessarily, includes the above-described cutting edges, rake faces, radius blends and other features at diagonally opposite corners. Thus, the cutting insert 10 is indexable and is mirror symmetric along a line passing through the ramping cutting edges 36, 38, or a line passing through the long cutting edges 24, 26. This mirror symmetry of the cutting insert 10 permits the cutting insert 10 to be used twice by rotating the cutting insert approximately 180 degrees before disposal.

Figure 3:
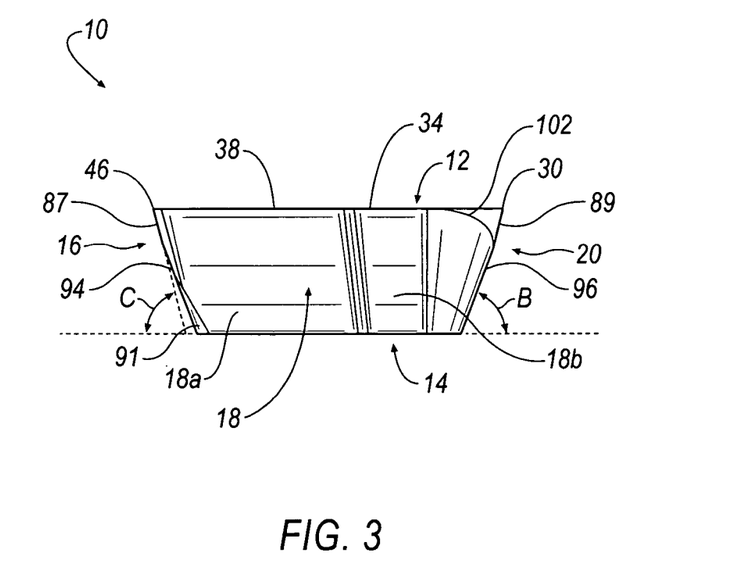
FIG. 3 shows an end view of the cutting insert of FIG. 1.
Figure 4:
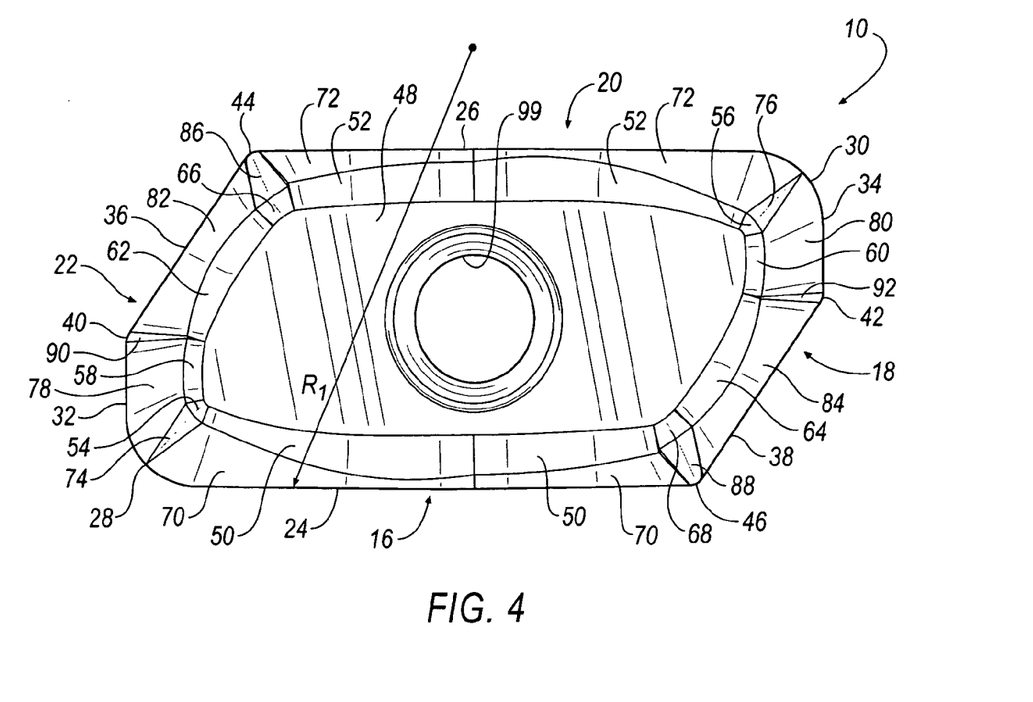
FIG. 4 shows a top view of the cutting insert of FIG. 1.
Figure 5:
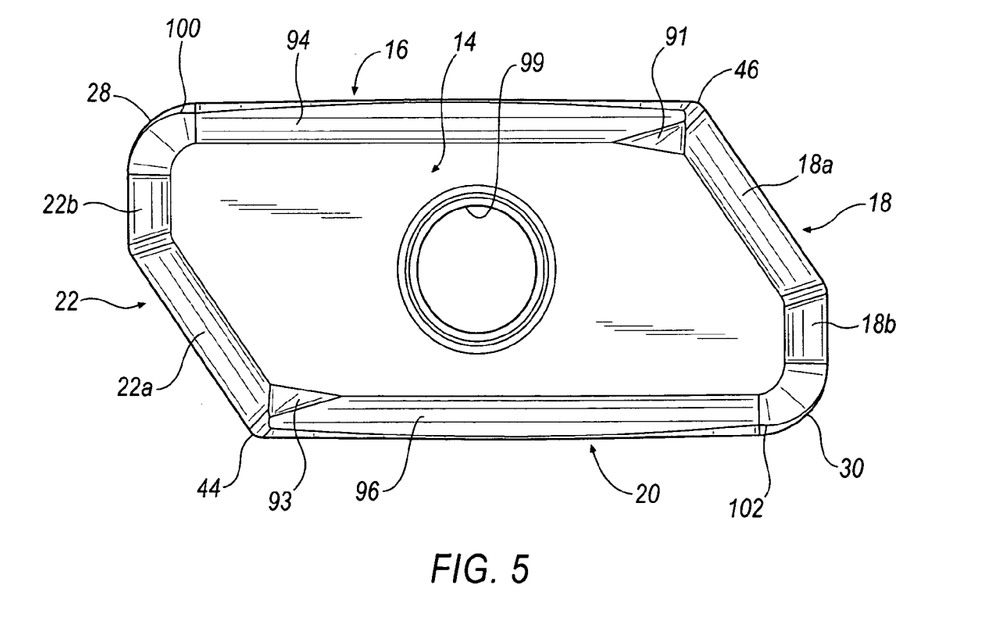
FIG. 5 shows a bottom view of the cutting insert of FIG. 1.
Figure 7:
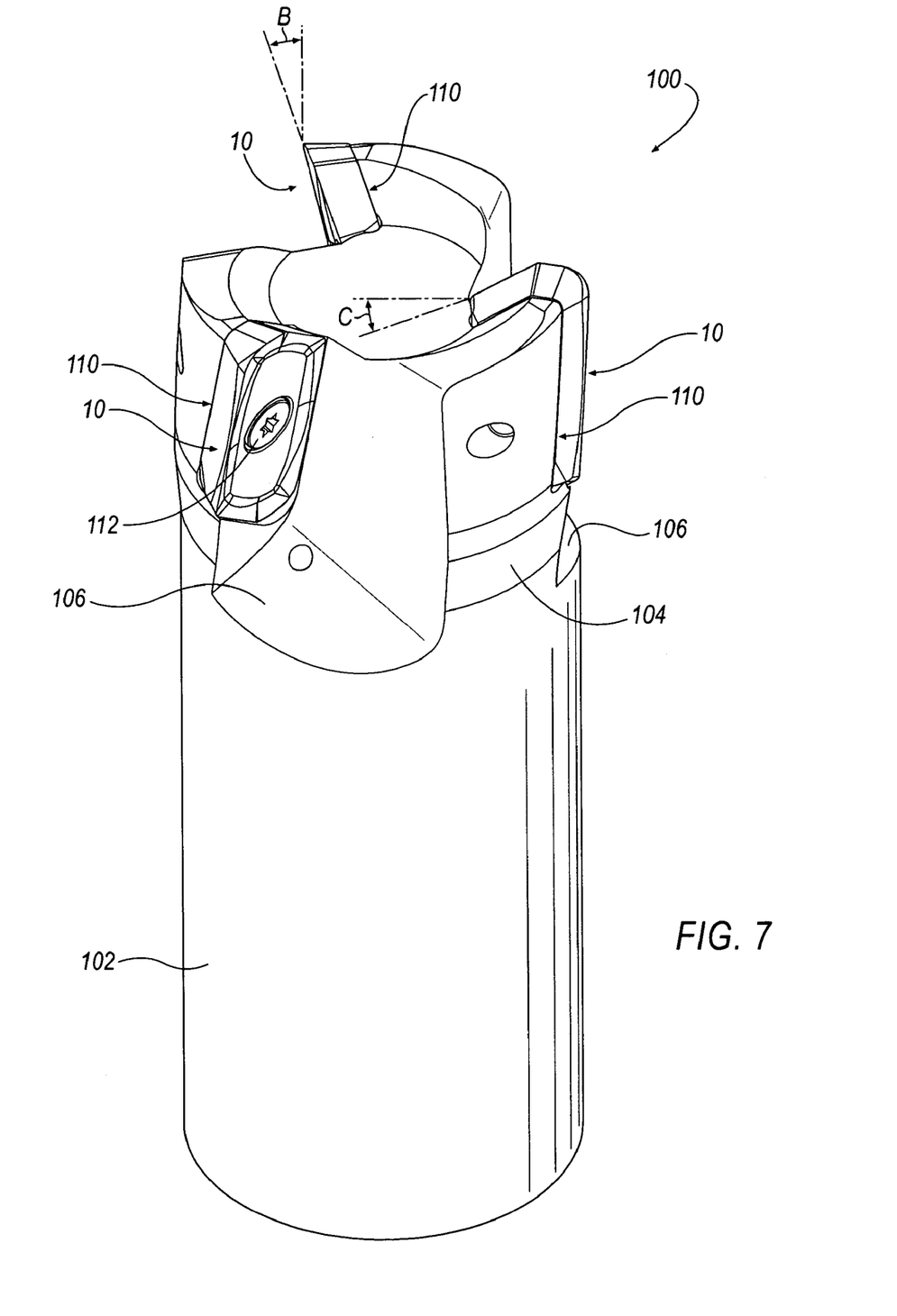
FIG. 7 shows a high-speed, long edge milling cutter according to an embodiment of the invention.

As shown in FIGS. 2 and 5, the side surfaces 16, 20 preferably, but not necessarily, include an angled flat surface 94, 96, respectively, extending from the bottom surface 14, as seen in FIGS. 3 and 4. Each angled flat surface 92, 94 include a radiused upper edge 95, 97, respectively. The flat surfaces 94, 96 act as a primary relief surface for seating the insert 10 in the pocket of the milling cutter, as shown in FIG. 7. The radiused upper edges 95, 97 facilitate in the formation of ninety (90) degree cylindrical walls on the work piece, as is commonly used in the art. In addition, the side surfaces 16, 20 include margins 87, 89 extending between the radiused upper edges 95, 97, respectively, and the long cutting edges 24, 26, respectively. Margins 87 and 89 have equal radius R1 of about 21 inches, which creates the long cutting edges 24 and 26. The margins 87 and 89 facilitate in the formation of a linear walls on the work piece when the milling cutter is adjusted to include axial rake, as is commonly known in the art. As shown in FIG. 3, the margins 87 and 89 and the surfaces 94 and 96 are at an angle with respect to the bottom surface 14. For example, the margins 87 and 89 are at a margin angle, C, between about sixty (60) to eighty (80) degrees, and most preferably about seventy-five (75) degrees with respect to the bottom surface 14 (and also with respect to the top surface 12). The surfaces 94 and 96 are at a seating angle, B, for example, of between about sixty-five (65) to eighty-five (85) degrees, and most preferably about seventy (70) degrees with respect to the bottom surface 14 (and also the top surface 12).

Irregardless of the magnitude of the seating angle, B, the margin angle, C, will be less than the seating angle, B, to form the radiused long cutting edges 24, 26 and to provide a flat surface for seating of the insert 10 in the pocket of the milling cutter. The margin angle, B, and the margins 87 and 89 extend around the nose radius of the insert 10 and blends into the seating angle, B, of the surfaces 18a, 18b at an intersection 100, 102 between the corner radius cutting edges (28, 30) of the nose radii and the facet radius cutting edges 32, 34. It will be appreciated that this is done to provide a smooth transition of all of the cutting edges of the insert 10 so no sharp points (radius less than 0.005 inches) are produced at the intersection between adjacent cutting edges. Further, the side surfaces 16, 20 include a faceted surface 91, 93 extending between the bottom surface 14 and the flat surfaces 94, 96, respectively.

Referring now to FIG. 7, a milling cutter 100 for use with the cutting insert 10 is shown according to an embodiment of the invention. In general, the milling cutter 100 includes a shank 102, a front portion 104 and a transition surface 106 between the shank 102 and the front portion 104. The cutter 100 is preferably made from heat-treated steel, such as H13 tool steel, or other materials known to those skilled in the art. The specific material used will vary as a consequence of desired design characteristics of the cutter 100. The cutter 100 defines a rotational axis 108. The cutter 100 also includes an insert pocket, shown generally at 110, formed in the front portion 104 at the leading end of the cutter 100. When mounted in the insert pocket 110 of the milling cutter 100, the cutting insert 10 provides an effectively positive radial rake angle of between about fifteen (15) degrees and about thirty-five (35).

To mount the cutting insert 10 in the insert pocket 110, the bottom surface of the insert pocket 110 may include a raised boss (not shown) with a threaded bore that is substantially aligned with the countersunk bore 99 of the cutting insert 10 when the cutting insert 10 is properly mounted in the insert pocket 110. The threaded bore is sized and positioned to threadably receive a threaded fastener 112, such as a retainer screw or the like, positioned in the countersunk bore 99, whereby the insert 10 may be securely, but releasably mounted in the insert pocket 110. Because the raised boss extends outwardly from the bottom surface of the insert pocket 110, the length of the retainer screw 112 can be shortened by the height of the raised boss, as compared to a conventional insert pocket. As a result of this shortened height, the retainer screw 112 contains fewer threads, which enables the retainer screw 112 to operate with less bending moment during high-speed milling operations, as compared to conventional milling cutters.

As seen in FIG. 2, the countersunk bore 99 extends from the top surface 12 to the bottom surface 14 of the cutting insert 10. The countersunk bore 99 has a marginally larger diameter at the top surface 12 than the diameter of the countersunk bore 99 at the bottom surface 14. The countersunk bore 99 preferably has a depth slightly larger than the height of the raised boss. In this manner, the cutting insert 10 is capable of being mounted in the insert pocket 110 such that the raised boss is disposed within the countersunk bore 99 of the cutting insert 10, while the bottom surface 14 of the cutting insert 10 engages the bottom surface of the insert pocket 110. In addition, the side surfaces 18, 20 (or 16, 22 depending on which orientation the cutting insert 10 is mounted in the insert pocket 110) of the cutting insert 10 engage the side surfaces of the insert pocket 110, respectively, to firmly secure the cutting insert 10 in the insert pocket 110.

As described above, the milling cutter 100 of the invention provides for a secondary safety feature comprising the raised boss of the insert pocket 110 in combination with the countersunk bore 99 of the cutting insert 10 that enables the cutting insert 10 to be used for high-speed milling operations. In addition, the milling cutter 10, 100 of the invention provides for the retainer screw 112 to have a shorter length not engaged and encompassed by additional material (i.e., boss 28) as compared to conventional milling cutters, enabling the retainer screw 112 to operate with less bending moment during high-speed milling operations.

The insert 10 is preferably made from cemented carbide or other materials known to those skilled in the art for milling a metallic work piece (not shown), such as aluminum, or the like. As seen in FIG. 7, the cutting insert 10 is mounted in the insert pocket 110 at an axial rake angle, B, of between approximately fifteen (15) and twenty-five (25) degrees, and a radial rake angle, C, of between plus ten (10) and minus twenty (20) degrees, based on cutter diameter.

In the illustrated embodiment of the milling cutter 100 shown in FIG. 7, the milling cutter 100 is capable of mounting three cutting inserts 10 oriented about 120 degrees with respect to each other within a respective insert pocket 110. However, it will be appreciated that the milling cutter of the invention is not limited by the number of cutting inserts 10 that can be mounted in the insert pockets 110, and that the invention can be practiced with any desired number of cutting inserts limited by only the physical limitations of the material properties of the milling cutter. For example, the milling cutter can be designed for mounting a fewer number of cutting inserts 10, or a greater number of cutting inserts 10 within a respective insert pocket 110.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. An indexable cutting insert for a high-speed, long edge milling cutter, comprising:
   a top surface having a substantially planar central portion, a substantially planar bottom surface, and a plurality of side surfaces; one side surface including a flat surface extending from the bottom surface and a margin extending from the top surface to the flat surface;
   a long cutting edge defined at an intersection between the top surface and the margin of one of the side surfaces;
   a corner radius cutting edge defined at an intersection between the top surface and one of the side surfaces;
   a facet radius cutting edge defined at an intersection between the top surface and one of the side surfaces; and
   a ramping cutting edge defined at the intersection between the top surface and one of the side surfaces,
   wherein the margin extends around a nose radius of said cutting insert and blends into the flat surface, and
   wherein a margin angle formed by the margin is less than a seating angle formed by the flat surface.

2. The cutting insert of claim 1, wherein the top surface includes a plurality of upward sloping radius blends extending between the substantially planar central portion and a plurality of upward sloping rake faces extending between a respective radius blend and a respective cutting edge such that the rake face forms an angle, A, of between five and twenty-five degrees with respect to the substantially planar central portion of the top surface of the cutting insert such that all the cutting edges lie in the same plane.

3. The cutting insert of claim 2, the rake face that extends from one of the radius blends to the long cutting edge slopes upwardly at an angle in a range of approximately fifteen to twenty-five degrees with respect to the planar central portion of the top surface of the cutting insert.

4. The cutting insert of claim 3, wherein the angle is approximately twenty degrees with respect to the planar central portion of the top surface of the cutting insert.

5. The cutting insert of claim 2, wherein the rake face that extends from one of the radius blends to the corner radius cutting edge slopes upwardly at an angle in a range of approximately five to fifteen degrees with respect to the planar central portion of the top surface of the cutting insert.

6. The cutting insert of claim 5, wherein the angle is approximately seven degrees with respect to the planar central portion of the top surface of the cutting insert.

7. The cutting insert of claim 2, wherein the rake face that extends from one of the radius blends to the facet radius cutting edge slopes upwardly at an angle in a range of approximately five to fifteen degrees with respect to the planar central portion of the top surface of the cutting insert.

8. The cutting insert of claim 7, wherein the angle is approximately ten degrees with respect to the planar central portion of the top surface of the cutting insert.

9. The cutting insert of claim 2, wherein the rake face that extends from one of the radius blends to the ramping cutting edge slopes upwardly at an angle in a range of approximately five to fifteen degrees with respect to the planar central portion of the top surface of the cutting insert.

10. The cutting insert of claim 9, wherein the angle is approximately eleven degrees with respect to the planar central portion of the top surface of the cutting insert.

11. The cutting insert of claim 2, further comprising a radius relief located at an intersection between the top surface and the facet radius cutting edge and between the top surface and the ramping cutting edge.

12. The cutting insert of claim 2, further comprising a radius relief located at an intersection between the top surface and the ramping cutting edge and between the top surface and the long cutting edge.

13. The cutting insert of claim 2, wherein one of the side surfaces comprises a first surface substantially perpendicular to an adjacent side surface, and a second surface formed at angle of less than ninety degrees with respect to the first surface.

14. The cutting insert of claim 2, wherein the facet radius cutting edge is formed at an angle of approximately ninety degrees with respect to the long cutting edge.

15. The cutting insert of claim 2, wherein the ramping cutting edge is formed at an angle in a range of approximately forty-five to approximately eighty-five degrees with respect to ramping cutting edge.

16. The cutting insert of claim 2, wherein one of the side surfaces include an angled flat surface extending from the bottom surface, and wherein the angled flat surface includes a radiused upper edge.

17. The cutting insert of claim 1, wherein all of the cutting edges lie in a plane substantially parallel to a plane along the central portion, and wherein all of the cutting edges lie in a plane substantially parallel to a plane along the bottom surface.

18. The cutting insert of claim 1, wherein the top surface of the insert is parallel to the bottom surface.

19. The cutting insert of claim 1, wherein the margin angle is in a range between about sixty to eighty degrees.

20. The cutting insert of claim 1, wherein the seating angle is in a range between about sixty-five to eighty-five degrees.

21. A high-speed, long edge milling cutter, comprising:
a shank having an insert pocket; and
at least one cutting insert having a top surface having a substantially planar central portion, a substantially planar bottom surface, and a plurality of side surfaces; one side surface including a flat surface extending from the bottom surface and a margin extending from the top surface to the flat surface; a long cutting edge defined at an intersection between the top surface and the margin of one of the side surfaces; a corner radius cutting edge defined at an intersection between the top surface and one of the side surfaces; a facet radius cutting edge defined at an intersection between the top surface and one of the side surfaces; and a ramping cutting edge defined at the intersection between the top surface and one of the side surfaces,
wherein the margin extends around a nose radius of said cutting insert and blends into the flat surface, and
wherein a margin angle formed by the margin is less than a seating angle formed by the flat surface.

22. The milling cutter of claim 21, wherein the top surface includes a plurality of upward sloping radius blends extending between the substantially planar central portion and a plurality of upward sloping rake faces extending between a respective radius blend and a respective cutting edge such that the rake face forms an angle, A, of between five and twenty-five degrees with respect to the substantially planar central portion of the top surface of the cutting insert such that all the cutting edges lie in the same plane.

23. The cutting insert of claim 21, wherein all of the cutting edges lie in a plane substantially parallel to a plane along the central portion, and wherein all of the cutting edges lie in a plane substantially parallel to a plane along the bottom surface.

* * * * *